US009483349B2

(12) United States Patent
Sundaram et al.

(10) Patent No.: US 9,483,349 B2
(45) Date of Patent: Nov. 1, 2016

(54) CLUSTERED RAID DATA ORGANIZATION

(71) Applicant: NetApp, Inc., Sunnyvale, CA (US)

(72) Inventors: Rajesh Sundaram, Mountain View, CA (US); Bharat Baddepudi, San Jose, CA (US); Jeffrey S. Kimmel, Chapel Hill, NC (US)

(73) Assignee: NetApp, Inc., Sunnyvale, CA (US)

(*) Notice: Subject to any disclaimer, the term of this patent is extended or adjusted under 35 U.S.C. 154(b) by 248 days.

(21) Appl. No.: 14/157,828

(22) Filed: Jan. 17, 2014

(65) Prior Publication Data

US 2015/0205663 A1 Jul. 23, 2015

(51) Int. Cl.
*G06F 12/10* (2016.01)
*G06F 11/10* (2006.01)
*G06F 11/20* (2006.01)

(52) U.S. Cl.
CPC .......... *G06F 11/108* (2013.01); *G06F 11/2033* (2013.01); *G06F 11/2035* (2013.01); *G06F 11/2094* (2013.01); *G06F 2211/1028* (2013.01)

(58) Field of Classification Search
CPC ............................ G06F 3/0689; G06F 11/108
USPC .......................................................... 711/114
See application file for complete search history.

(56) References Cited

U.S. PATENT DOCUMENTS 5,937,425 A 8/1999 Ban
6,219,800 B1 4/2001 Johnson et al.
7,249,150 B1 7/2007 Watanabe et al.
7,680,837 B2 3/2010 Yamato
7,996,636 B1 8/2011 Prakash et al.
8,082,390 B1 12/2011 Fan et al.
8,099,396 B1 1/2012 Novick et al.
8,140,860 B2 3/2012 Haswell
8,156,290 B1 4/2012 Vanninen et al.
8,205,065 B2 6/2012 Matze
8,341,457 B2 12/2012 Spry et al.
8,417,987 B1 4/2013 Goel et al.
8,495,417 B2 7/2013 Jernigan, IV et al.
8,539,008 B2 9/2013 Faith et al.
8,560,879 B1 10/2013 Goel
8,589,625 B2 11/2013 Colgrove et al.
8,595,595 B1 11/2013 Grcanac et al.
8,732,426 B2 5/2014 Colgrove et al.
8,775,868 B2 7/2014 Colgrove et al.
8,832,373 B2 9/2014 Colgrove et al.
2002/0091897 A1* 7/2002 Chiu .................. G06F 11/1076 711/114
2003/0120869 A1 6/2003 Lee et al.
2003/0191916 A1 10/2003 McBrearty et al.

(Continued)

OTHER PUBLICATIONS

Hwang, Kai et al., "RAID-x: A New Distributed Disk Array for I/O-centric Cluster Computing", IEEE High-Performance Distributed Computing, Aug. 2000, pp. 279-286.

(Continued)

*Primary Examiner* — Jae Yu
(74) *Attorney, Agent, or Firm* — Cesari and McKenna, LLP

(57) ABSTRACT

In one embodiment, a node of a cluster having a plurality of nodes, executes a storage input/output (I/O) stack having a redundant array of independent disks (RAID) layer. The RAID layer organizes solid state drives (SSDs) within one or more storage arrays as a plurality of RAID groups associated with one or more extent stores. The RAID groups are formed from slices of storage spaces of the SSDs instead of entire storage spaces of the SSDs. This provides for RAID groups to co-exist on a same set of the SSDs.

20 Claims, 14 Drawing Sheets

MEMORY 220
STORAGE I/O STACK 300
OPERATING SYSTEM KERNEL 224
215
CPU 210
200
SYSTEM INTERCONNECT 270
CLUSTER DB 244
248
NETWORK ADAPTER 230
TO/FROM HOST(S)
STORAGE CONTROLLER 240
NVRAM 280
NVLOGS 285
STORAGE CONTROLLER 240
CLUSTER INTERCONNECT INTERFACE 250
TO/FROM CLUSTER NODE(S)
140
140
SSD 260
SSD 260
. . .
SSD 260
150

(56) References Cited

U.S. PATENT DOCUMENTS

| | | | |
|---|---|---|---|
| 2005/0144514 | A1 | 6/2005 | Ulrich et al. |
| 2007/0143359 | A1 | 6/2007 | Uppala |
| 2010/0042790 | A1 | 2/2010 | Mondal et al. |
| 2010/0088296 | A1 | 4/2010 | Periyagaram et al. |
| 2011/0035548 | A1 | 2/2011 | Kimmel et al. |
| 2011/0213928 | A1 | 9/2011 | Grube et al. |
| 2012/0079318 | A1 | 3/2012 | Colgrove et al. |
| 2012/0084506 | A1 | 4/2012 | Colgrove et al. |
| 2012/0290788 | A1 | 11/2012 | Klemm et al. |
| 2013/0018854 | A1 | 1/2013 | Condict |
| 2013/0019057 | A1 | 1/2013 | Stephens |
| 2013/0138862 | A1 | 5/2013 | Motwani et al. |
| 2013/0238832 | A1 | 9/2013 | Dronamraju et al. |
| 2013/0238932 | A1 | 9/2013 | Resch |
| 2013/0268497 | A1 | 10/2013 | Baldwin et al. |
| 2013/0346810 | A1 | 12/2013 | Kimmel et al. |
| 2014/0215129 | A1 | 7/2014 | Kuzmin et al. |
| 2014/0379965 | A1 | 12/2014 | Gole et al. |

OTHER PUBLICATIONS

Ongaro, Diego et al., "In Search of an Understandable Consensus Algorithm," Stanford University, May 2013. Downloaded from https://ramcloud.stanford.edu/wiki/download/attachments/11370504/raft.pdf, 14 pages.

Cornwall, Michael, "Anatomy of a Solid-state Drive," ACM Queue—Networks, vol. 10, No. 10, Oct. 2012, pp. 1-7.

"Cuckoo hashing," Wikipedia, http://en.wikipedia.org/wiki/Cuckoo_hash, Apr. 2013, pp. 1-5.

Culik, K., et al., "Dense Multiway Trees," ACM Transactions on Database Systems, vol. 6, Issue 3, Sep. 1981, pp. 486-512.

Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.

Gal, Eran et al., "Algorithms and Data Structures for Flash Memories," ACM Computing Surveys, vol. 37, No. 2, Jun. 2005, pp. 138-163.

Gray, Jim et al., "Flash Disk Opportunity for Server Applications," Queue—Enterprise Flash Storage, vol. 6, Issue 4, Jul.-Aug. 2008, pp. 18-23.

Handy, Jim, "SSSI Tech Notes: How Controllers Maximize SSD Lite," SNIA, Jan. 2013, pp. 1-20.

Leventhal, Adam H., "A File System All Its Own," Communications of the ACM Queue, vol. 56, No. 5, May 2013, pp. 64-67.

Lim, H. et al., "SILT: A Memory-Efficient, High-Performance Key-Value Store," Proceedings of the 23rd ACM Symposium on Operating Systems Principles (SOSP'11), Oct. 23-26, 2011, pp. 1-13.

Moshayedi, Mark, et al., "Enterprise SSDs," ACM Queue—Enterprise Flash Storage, vol. 6 No. 4, Jul.-Aug. 2008, pp. 32-39.

Pagh, Rasmus, et al.. "Cuckoo Hashing," Elsevier Science, Dec. 8, 2003, pp. 1-27.

Pagh, Rasmus, "Cuckoo Hashing for Undergraduates," IT University of Copenhagen, Mar. 27, 2006, pp. 1-6.

Rosenblum, Mendel, et al., "The Design and Implementation of a Log-Structured File System," Proceedings of the 13th ACM Symposium on Operating Systems Principles, Jul. 24, 1991, pp. 1-15.

Rosenblum, Mendel, et al., "The LFS Storage Manager," Summer '90 USENIX Technical Conference, Anaheim, California, Jun. 1990, pp. 1-16.

Rosenblum, Mendel, "The Design and Implementation of a Log-structured File System," UC Berkeley, Thesis, 1992, pp. 1-101.

Seltzer, Margo, et al., "An Implementation of a Log Structured File System for UNIX," Winter USENIX, San Diego, CA, Jan. 25-29, 1993, pp. 1-18.

Seltzer, Margo, et al., "File System Performance and Transaction Support." UC Berkeley, Thesis, 1992, pp. 1-131.

Smith, Kent, "Garbage Collection," SandForce, Flash Memory Summit, Santa Clara, CA, Aug. 2011, pp. 1-9.

Twigg, Andy, et al., "Stratified B-trees and Versioned Dictionaries," Proceedings of the 3rd USENIX Conference on Hot Topics in Storage and File Systems, vol. 11, 2011, pp. 1-5.

Wu, Po-Liang, et al., "A File-System-Aware FTL Design for Flash-Memory Storage Systems," Design, Automation & Test in Europe Conference & Exhibition, IEEE, 2009, pp. 1-6.

* cited by examiner

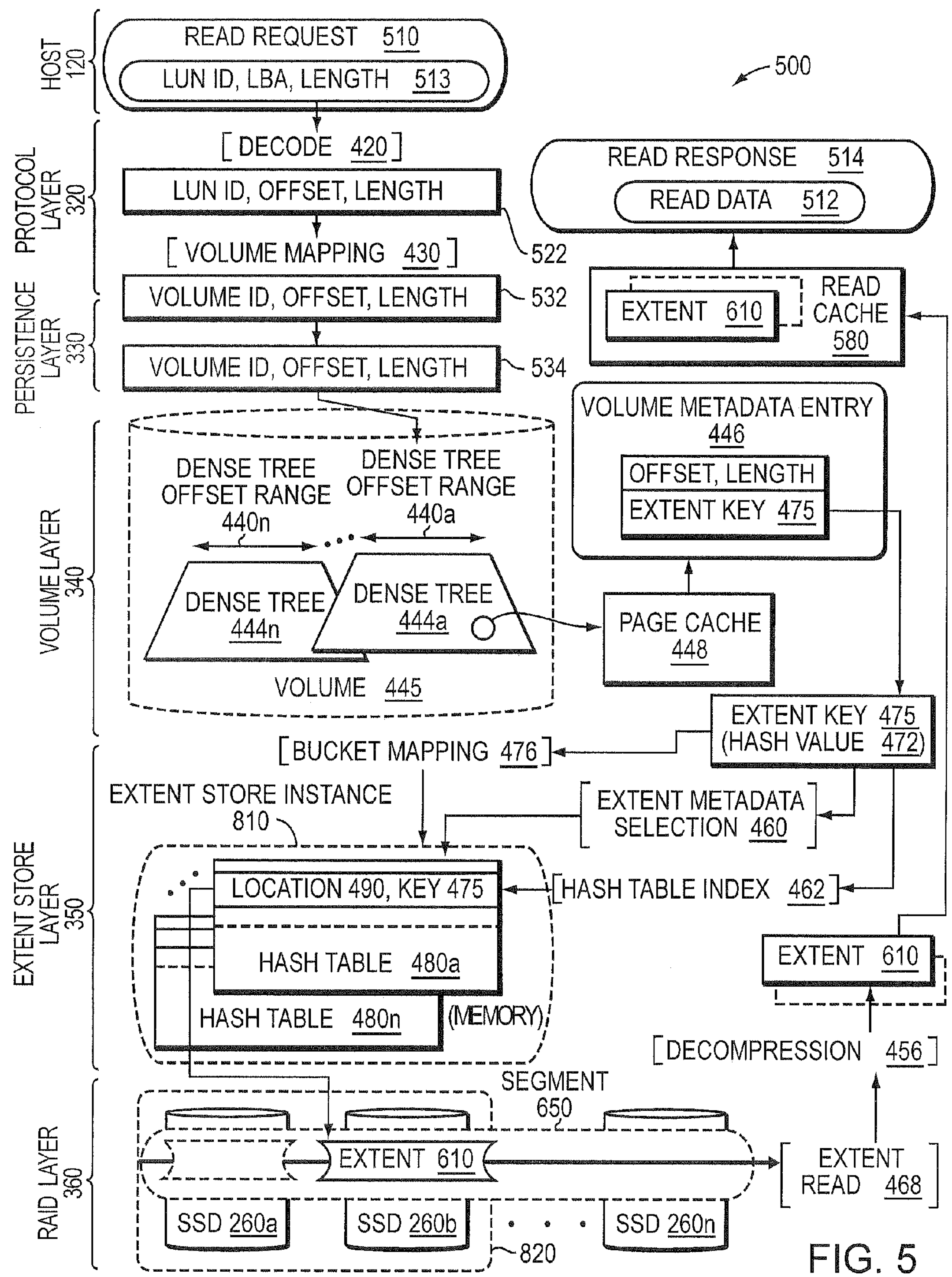

HOST 120
READ REQUEST 510
LUN ID, LBA, LENGTH 513
500
PROTOCOL LAYER 320
DECODE 420
LUN ID, OFFSET, LENGTH
522
VOLUME MAPPING 430
READ RESPONSE 514
READ DATA 512
PERSISTENCE LAYER 330
VOLUME ID, OFFSET, LENGTH
532
VOLUME ID, OFFSET, LENGTH
534
EXTENT 610
READ CACHE 580
VOLUME LAYER 340
DENSE TREE OFFSET RANGE 440n
DENSE TREE OFFSET RANGE 440a
DENSE TREE 444n
DENSE TREE 444a
VOLUME 445
VOLUME METADATA ENTRY 446
OFFSET, LENGTH
EXTENT KEY 475
PAGE CACHE 448
EXTENT KEY 475 (HASH VALUE 472)
EXTENT STORE LAYER 350
BUCKET MAPPING 476
EXTENT STORE INSTANCE 810
EXTENT METADATA SELECTION 460
LOCATION 490, KEY 475
HASH TABLE INDEX 462
HASH TABLE 480a
HASH TABLE 480n
(MEMORY)
EXTENT 610
DECOMPRESSION 456
RAID LAYER 360
SEGMENT 650
EXTENT 610
EXTENT READ 468
SSD 260a
SSD 260b
SSD 260n
820
FIG. 5

CLUSTERED RAID DATA ORGANIZATION

BACKGROUND

1. Technical Field

The present disclosure relates to clustered storage systems and, more specifically, to an organization of data and parity information in one or more Redundant Array of Independent Disks (RAID) groups within a clustered storage system.

2. Background Information

A storage system typically includes one or more storage devices, such as solid state drives (SSDs) embodied as flash storage devices, into which information may be entered, and from which the information may be obtained, as desired. The storage system may organize the storage devices into one or more Redundant Array of Independent Disks (RAID) groups, each having storage space on the devices dedicated to storing data and parity (i.e., redundant) information. The storage system may further implement a high-level module, such as a file system, to logically organize the information stored on the devices as storage containers such as, inter alia, files or logical units (LUNs). Typically, a storage container may be housed (stored) within a RAID group to reduce the parity overhead and enable efficient allocation of parity storage in the group.

For example, assume three storage containers are formed from a set of 24 SSDs. The SSDs are then divided into three RAID groups of 8 SSDs, i.e., one for each of the three storage containers. If double parity protection is employed for each RAID group (i.e., a 6+2 RAID configuration), then the equivalent storage space of at least two SSDs from each RAID group is dedicated to storing parity (i.e., redundancy) information resulting in a parity ratio of 2/8 (=25%). This is inefficient as compared to using a single RAID group to store all three containers, which results in a parity ratio of 2/24 (=8.3%) for a 22+2 RAID configuration.

Such inefficient allocation of parity storage for RAID groups may arise in a clustered storage system (cluster) having, e.g., a high availability (i.e., failover) arrangement configured to service a number of storage containers. When a node (i.e., storage system) of the cluster fails, the failed node's storage containers may be distributed to the remaining (i.e., surviving) nodes, which takeover servicing of those containers. However, this arrangement usually requires additional RAID groups, i.e., at least one RAID group for each storage container originally serviced by the failed node, because each container may be owned (i.e., serviced) by only one node at a time. Accordingly, each storage container may be stored in a RAID group, so that the container may be distributed to another (i.e., surviving) node in the event of a node failure.

As a further example, assume a 4-node cluster arrangement having 24 SSDs, where each node serves three storage containers (i.e., 12 containers in the cluster) and one node fails resulting in three surviving nodes. The three storage containers from the failed node may then be distributed to the surviving nodes, i.e., one container from the failed node to each of the three surviving nodes. Since each storage container is stored in a RAID group, this arrangement requires that the storage containers be divided among 12 separate RAID groups. Therefore, the 24 SSDs are divided into 12 RAID groups, e.g., two SSDs per RAID group in a 1+1 RAID configuration (i.e., mirror) having a 1/2 (=50%) parity ratio. Moreover, if double parity is desired (e.g., at a minimum three SSDs per RAID group in a 1+2 RAID configuration), then at least 36 SSDs are needed (3×12) to house the 12 storage containers, resulting in a substantially high, 2/3 (≈67%) parity ratio.

Accordingly, there is a need to organize RAID groups and storage containers of a cluster, so as to reduce the parity overhead of the RAID groups, as well as to facilitate distribution and service of the containers among surviving nodes when one or more nodes of the cluster fail.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which:

FIG. 5 illustrates a read path of the storage I/O stack;

Figure 9:
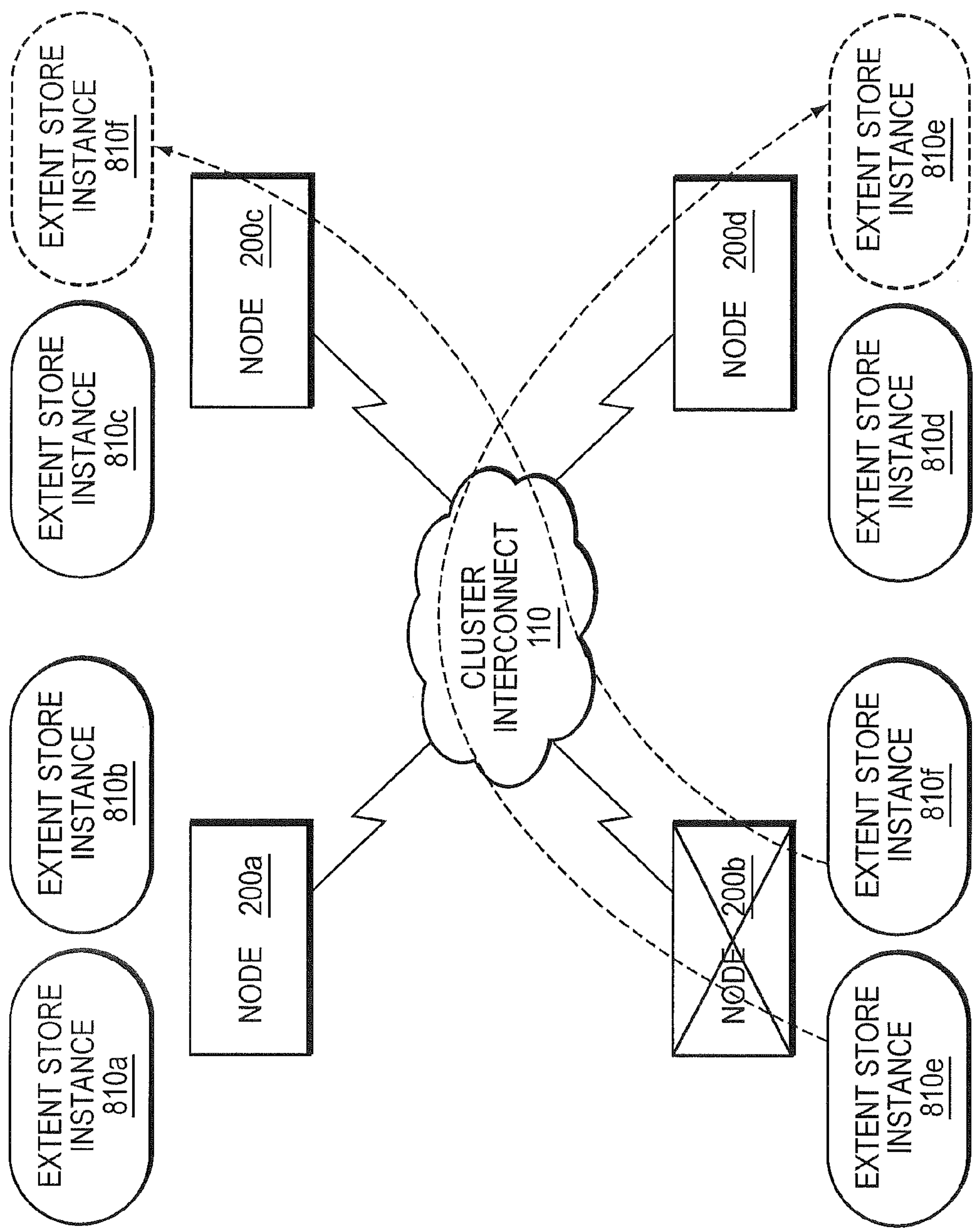
Figure 10A:
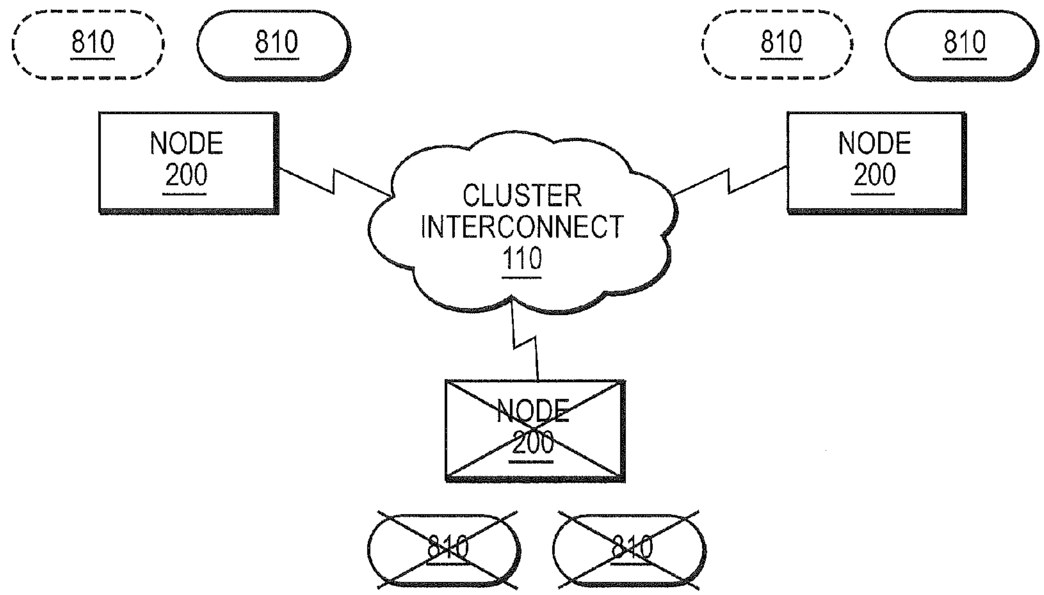
Figure 10B:
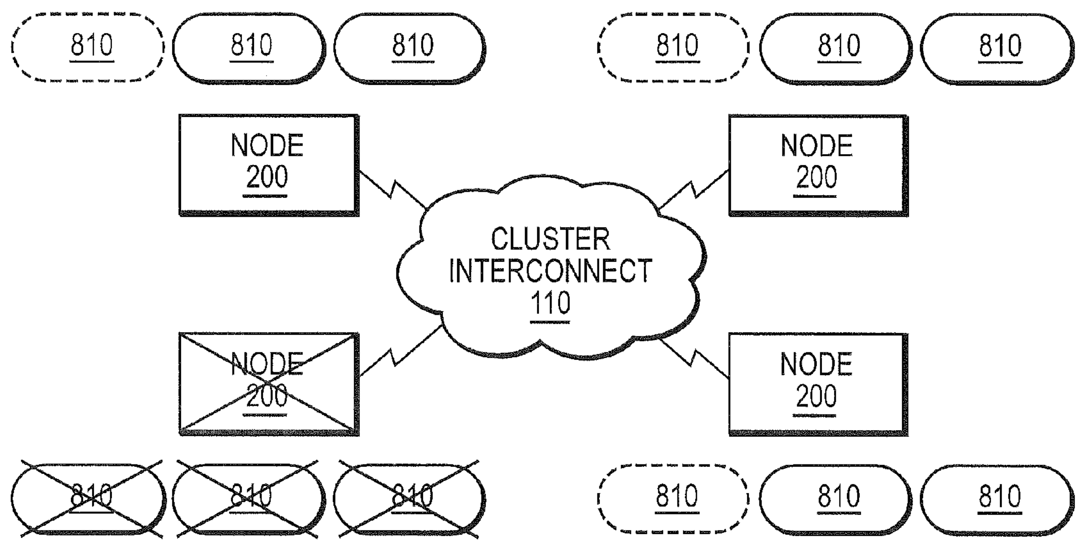

FIG. **7*a*** illustrates a RAID stripe formed by the layered file system;

FIG. **7*b*** illustrates changes to a segment-based RAID data organization in accordance with changes to a storage pool of the cluster;

FIG. **7*c*** illustrates RAID group slices;

FIG. **8*a*** illustrates a RAID configuration topology tree structure;

FIG. **8*b*** illustrates data structures for a disk label and a RAID header;

FIG. **8*c*** is an example simplified procedure for lost write detection;

FIG. 9 illustrates a failover of extent store instances;

FIG. **10*a* illustrates a failover distribution of extent store instances in a three-node cluster; and FIG. 10*b*** illustrates a failover distribution of extent store instances in a four-node cluster.

DETAILED DESCRIPTION OF ILLUSTRATIVE EMBODIMENTS

The embodiments described herein are directed to a Redundant Array of Independent Disks (RAID) organization of storage containers and RAID groups of a clustered storage system (cluster) configured to reduce parity overhead of the RAID groups, as well as facilitate distribution and servicing of the storage containers among storage systems (nodes) of the cluster. The storage containers may be stored on one or more storage arrays of storage devices, such as solid state drives (SSDs), connected to the nodes of the cluster. The RAID organization may be configured to identify the SSDs, which may be organized as one or more RAID groups associated with an extent store. Notably, the RAID groups may be formed from slices (i.e., portions) of storage spaces of the SSDs instead of the entire storage spaces of the SSDs. That is, each RAID group may be formed "horizontally" across a set of SSDs as slices (i.e., one slice of storage space from each SSD in the set). Accordingly, a plurality of RAID groups may co-exist (i.e., be stacked) on the same set of SSDs, such that each RAID group allotted from the set of SSDs may have a similar parity ratio.

In an embodiment, each extent store includes segments horizontally spanning a RAID group, wherein each segment represents a unit of redundancy within the RAID group. That is, parity and data may be arranged on a segment-by-segment basis according to the RAID configuration of the segment supported by the underlying RAID group. Each segment within the same RAID group may thus have different parity distribution and/or amount of parity overhead. For example, one segment may use a slice on a first SSD for parity, whereas another segment may use a slice on a second SSD for parity. In addition, one segment may use single parity protection (e.g., RAID 5) and another segment may use double parity protection (e.g., RAID 6). It should be noted that each segment may be associated with a separate (or the same) RAID group, and that each extent store may be associated with a plurality of RAID groups.

In an embodiment, the SSDs may be configured with multi-host access (i.e., multi-stream) capability to thereby enable more than one extent store to coexist on the same set of SSDs. That is, the multi-stream capability of the SSDs may allow an extent store on a first RAID group to be efficiently serviced by one node, while another extent store on a second RAID group may be serviced by another node. Thus, different nodes may access different RAID groups on the same SSD as if they were independent. In this manner, extent stores may share SSDs, but those extent stores may be serviced by different nodes of the cluster. Accordingly, a set of SSDs of the storage array may include a plurality of extent stores, each having a plurality of segments and wherein each segment may be stored on a different RAID group formed from slices across the set of the SSDs.

In an embodiment, write operations resulting in incomplete or corrupt data stored to media of an SSD (i.e., lost write) may be detected by comparing a generation identifier of a segment having the lost write data with an identifier in a RAID header associated with the lost write data. A lost write may be detected when the comparison of the identifiers results in a mismatch.

In response to failure of a node, servicing (i.e., ownership) of the failed node's extent stores may be distributed to remaining (i.e., surviving) nodes of the cluster, wherein an extent store instance is the unit of failover. In an embodiment, servicing of the failed node's extent stores may be distributed evenly (i.e., load balanced) to the surviving nodes. Thus, for a cluster of N nodes, extent stores may be evenly distributed among N−1 surviving nodes, wherein each node may have a multiple of N−1, i.e., m·(N−1), extent stores so that m extent stores may be distributed to each of the N−1 surviving nodes.

Description

Storage Cluster

Figure 1:
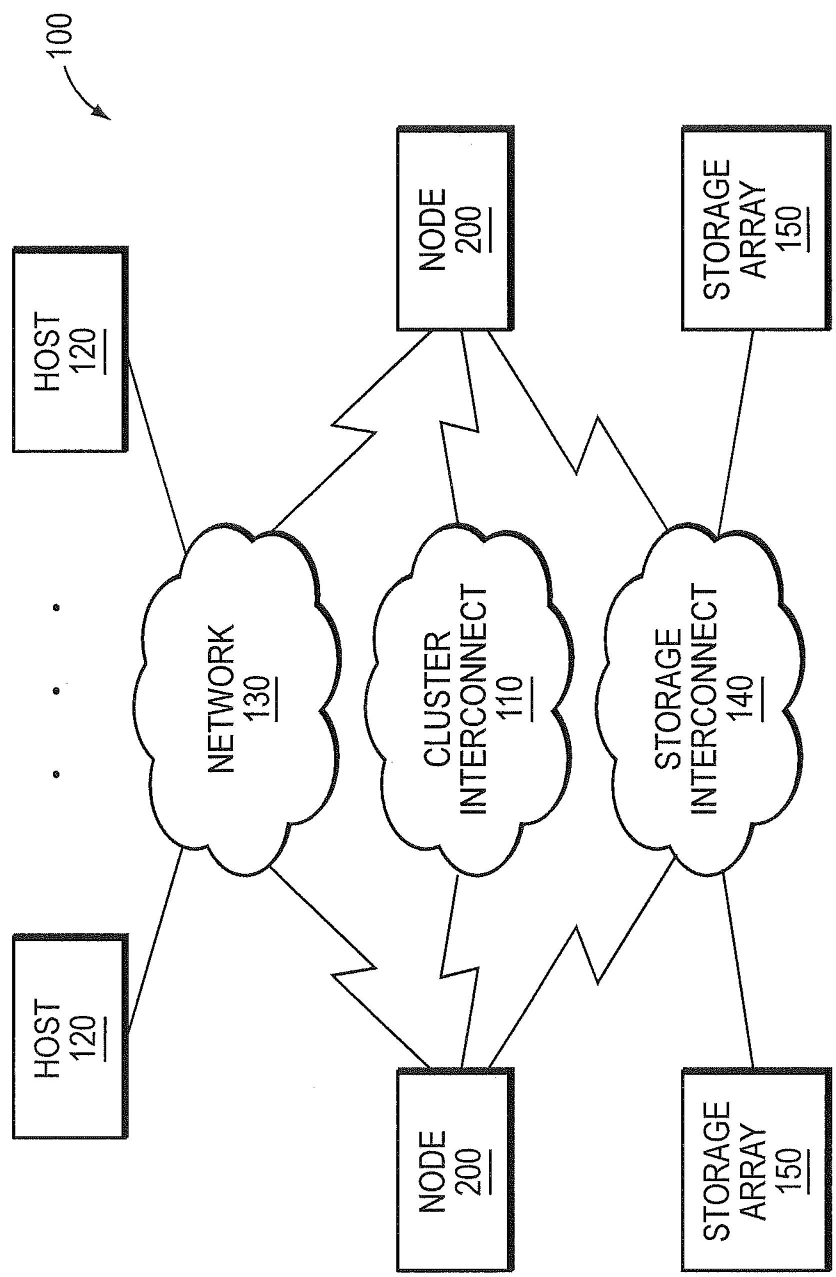
FIG. 1 is a block diagram of a plurality of nodes interconnected as a cluster.

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
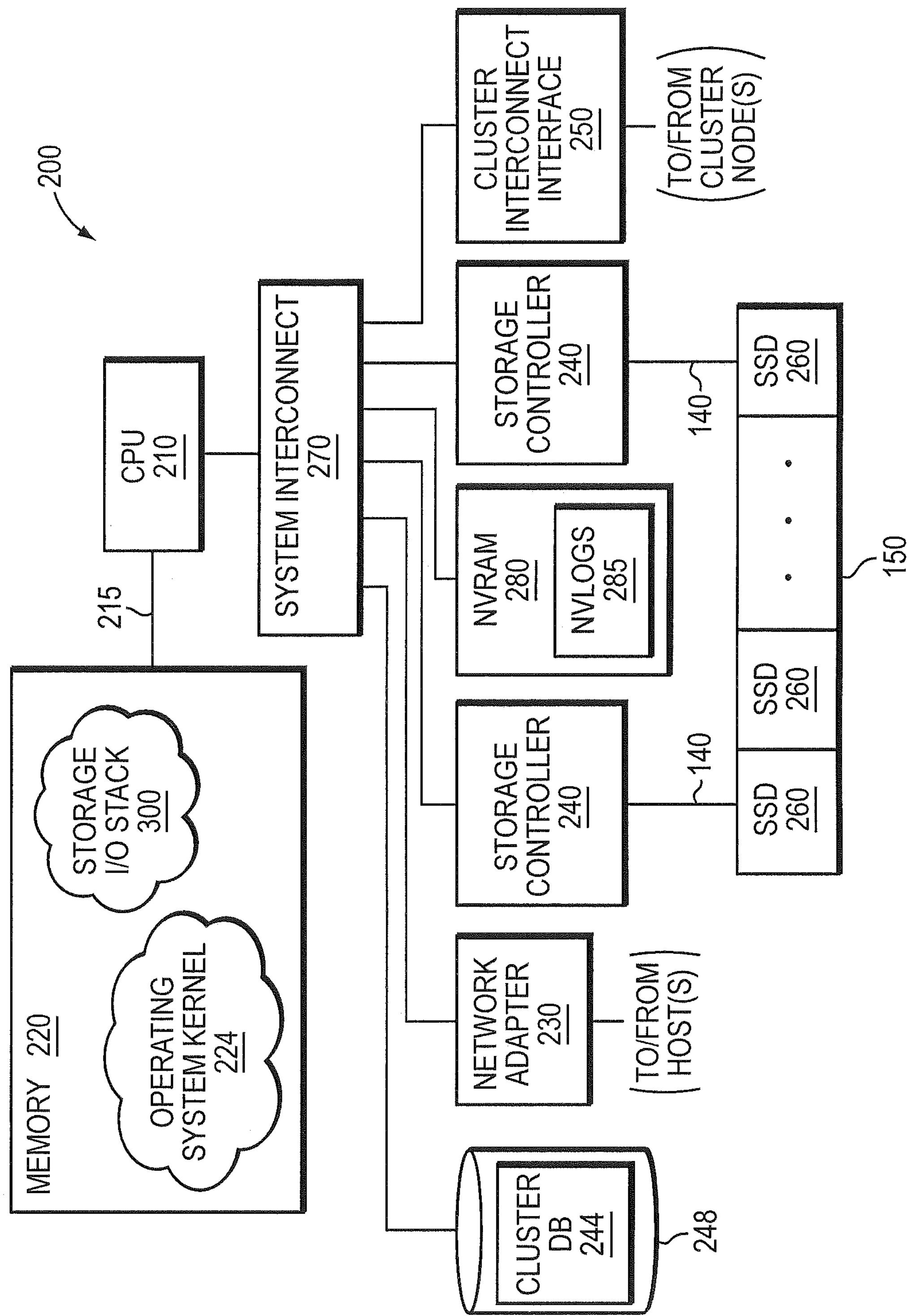
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250, and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
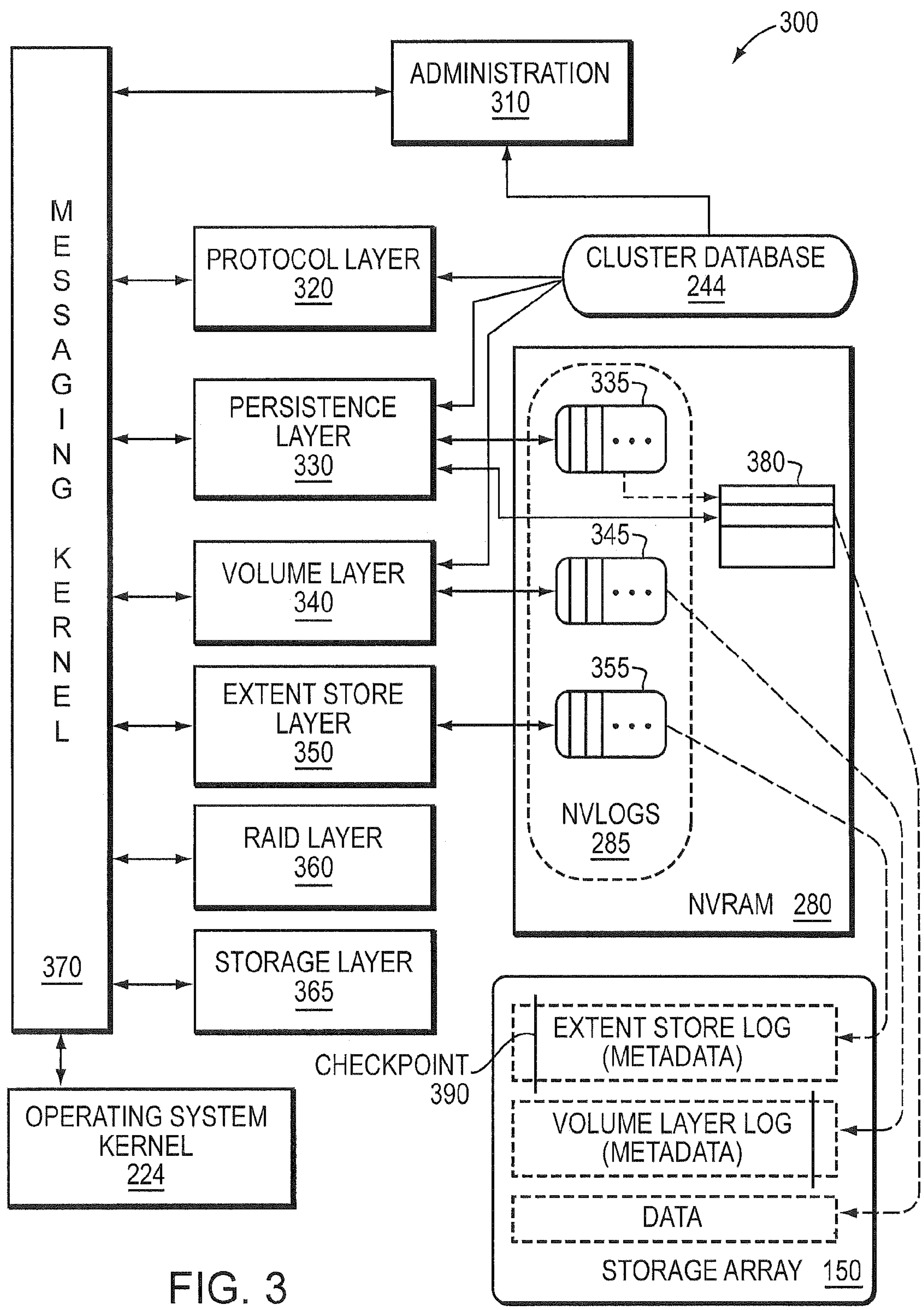
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism, and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380 illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art that other variations of data structures may be used to store or maintain the write data in NVRAM including data structures with no logs. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range and length, hereinafter offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., offsets) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas retirement of log entries ensures that the entries accumulated in the volume layer log 345 synchronize with the metadata checkpoints committed to the storage array 150 by, e.g., retiring those accumulated log entries prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested “put” and “delete” operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a “fuzzy” checkpoint 390 (i.e., checkpoint with incremental changes recorded in one or more log files) in which selected in-core mappings (less than the total), are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data “stripes” having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
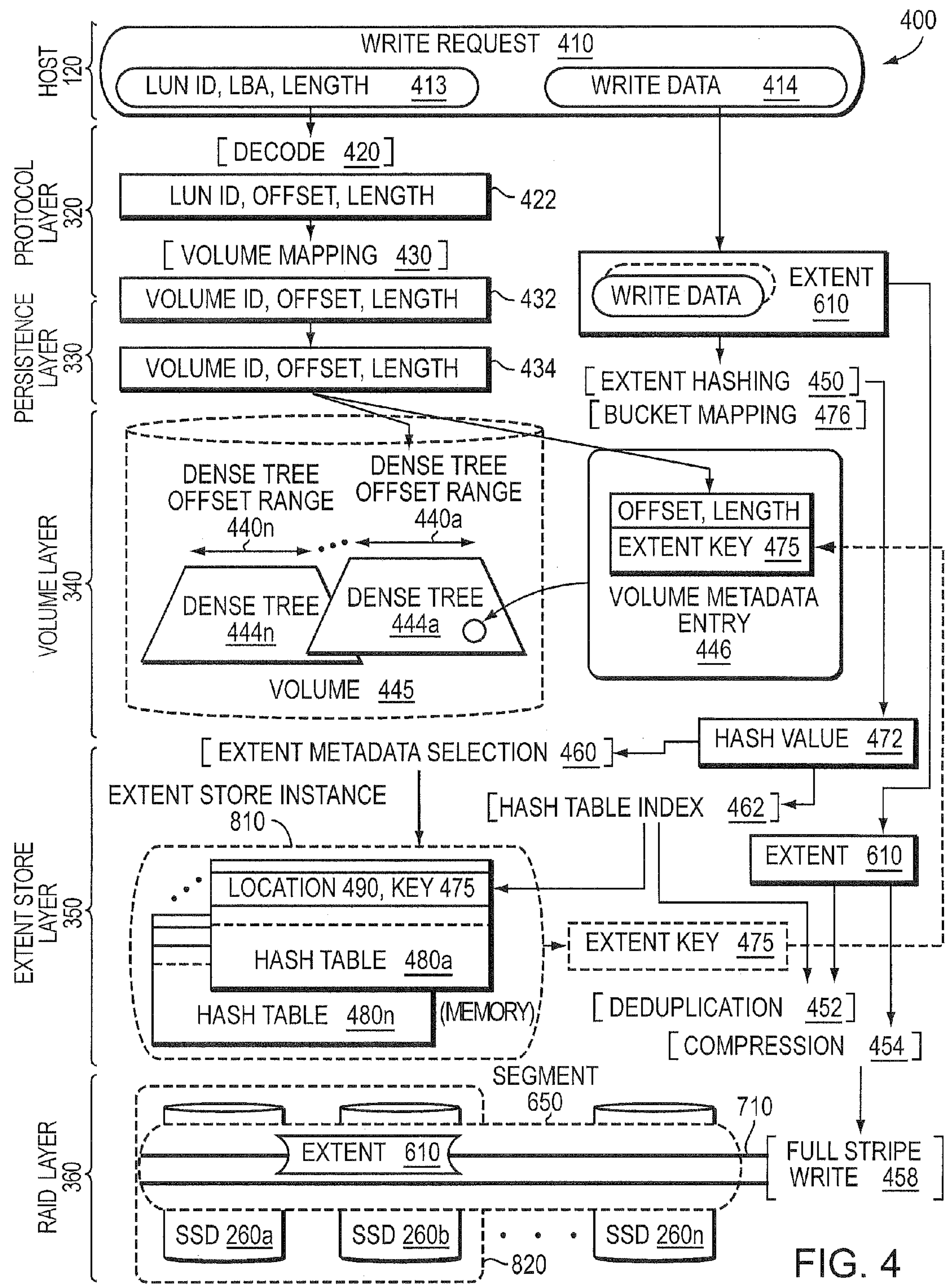
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. The persistence layer 330 may aggregate and organize write data 414 from one or more write requests into a new extent 610 and perform a hash computation, i.e., a hash function, on the new extent to generate a hash value 472 in accordance with an extent hashing technique 450.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (i.e., extent store instance 810) that is responsible for storing the new extent 610. Note, the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 610 to the appropriate volume layer instance and onto the appropriate extent store instance via an extent store put operation. The extent hashing technique 450 may embody an approximately uniform hash function to ensure that any random extent to be written may have an approximately equal chance of falling into any extent store instance 810, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 460 that (i) selects an appropriate hash table 480 (e.g., hash table **480*a*) from a set of hash tables (illustratively in-core) within the extent store instance 810, and (ii) extracts a hash table index 462 from the hash value 472 to index into the selected hash table and lookup a table entry having an extent key 475 identifying a storage location 490 on SSD 260 for the extent. Accordingly, the extent store layer 350 contains computer executable instructions executed by the CPU 210 to perform operations that implement the extent metadata selection technique 460 described herein. If a table entry with a matching extent key is found, then the SSD location 490 mapped from the extent key 475 is used to retrieve an existing extent (not shown) from SSD. The existing extent is then compared with the new extent 610 to determine whether their data is identical. If the data is identical, the new extent 610 is already stored on SSD 260 and a de-duplication opportunity (denoted de-duplication 452) exists such that there is no need to write another copy of the data. Accordingly, a reference count in the table entry for the existing extent is incremented and the extent key 475 of the existing extent is passed to the appropriate volume layer instance for storage within an entry (denoted as volume metadata entry 446) of a dense tree metadata structure 444 (e.g., dense tree 444*a*), such that the extent key 475 is associated an offset range 440 (e.g., offset range 440*a*) of the volume 445**.

However, if the data of the existing extent is not identical to the data of the new extent 610, a collision occurs and a deterministic algorithm is invoked to sequentially generate as many new candidate extent keys (not shown) mapping to the same bucket as needed to either provide de-duplication 452 or to produce an extent key that is not already stored within the extent store instance. Notably, another hash table (e.g. hash table **480*n*) may be selected by a new candidate extent key in accordance with the extent metadata selection technique 460. In the event that no de-duplication opportunity exists (i.e., the extent is not already stored) the new extent 610 is compressed in accordance with compression technique 454 and passed to the RAID layer 360, which processes the new extent 610 for storage on SSD 260 within one or more stripes 710 of RAID group 820. The extent store instance may cooperate with the RAID layer 360 to identify a storage segment 650 (i.e., a portion of the storage array 150) and a location on SSD 260 within the segment 650 in which to store the new extent 610. Illustratively, the identified storage segment is a segment with a large contiguous free space having, e.g., location 490 on SSD 260*b* for storing the extent 610**.

In an embodiment, the RAID layer 360 then writes the stripes 710 across the RAID group 820, illustratively as one or more full stripe writes 458. The RAID layer 360 may write a series of stripes 710 of sufficient depth to reduce data relocation that may occur within the flash-based SSDs 260 (i.e., flash block management). The extent store instance then (i) loads the SSD location 490 of the new extent 610 into the selected hash table **480*n* (i.e., as selected by the new candidate extent key), (ii) passes a new extent key (denoted as extent key 475) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444*a* spanning an offset range 440*a* of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444*a* and records a change corresponding to the volume metadata entry in the volume layer log 345. Accordingly, the I/O (write) request is sufficiently stored on SSD 260** of the cluster.

Read Path

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the decoded results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write-back cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure 444 (e.g., dense tree 444*a*) associated with a region (e.g., offset range 440*a*) of a volume 445 that encompasses the requested offset range (specified by parameters 534). The volume layer instance may further process the read request to search for (lookup) one or more volume metadata entries 446 of the dense tree 444*a* to obtain one or more extent keys 475 associated with one or more extents 610 (or portions of extents) within the requested offset range. In an embodiment, each dense tree 444 may be embodied as multiple levels of a search structure with possibly overlapping offset range entries at each level. The various levels of the dense tree may have volume metadata entries 446 for the same offset, in which case, the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level (not shown) is accessed. The metadata page (i.e., in the page cache 448) at the next level is then searched to find any overlapping entries. This process is then iterated until one or more volume metadata entries 446 of a level are found to ensure that the extent key(s) 475 for the entire requested read range are found. If no metadata entries exist for the entire or portions of the requested range, then the missing portion(s) are zero filled.

Once found, each extent key 475 is processed by the volume layer 340 to, e.g., implement the bucket mapping technique 476 that translates the extent key to an appropriate extent store instance 810 responsible for storing the requested extent 610. Note that, in an embodiment, each extent key 475 may be substantially identical to the hash value 472 associated with the extent 610, i.e., the hash value as calculated during the write request for the extent, such that the bucket mapping 476 and extent metadata selection 460 techniques may be used for both write and read path operations. Note also that the extent key 475 may be derived from the hash value 472. The volume layer 340 may then pass the extent key 475 (i.e., the hash value from a previous write request for the extent) to the appropriate extent store instance 810 (via an extent store get operation), which performs an extent key-to-SSD mapping to determine the location on SSD 260 for the extent.

In response to the get operation, the extent store instance may process the extent key 475 (i.e., hash value 472) to perform the extent metadata selection technique 460 that (i) selects an appropriate hash table 480 (e.g., hash table 480*a*) from a set of hash tables within the extent store instance 810, and (ii) extracts a hash table index 462 from the extent key 475 (i.e., hash value 472) to index into the selected hash table and lookup a table entry having a matching extent key 475 that identifies a storage location 490 on SSD 260 for the extent 610. That is, the SSD location 490 mapped to the extent key 475 may be used to retrieve the existing extent (denoted as extent 610) from SSD 260 (e.g., SSD 260*b*). The extent store instance then cooperates with the RAID layer 360 to access the extent on SSD 260*b* and retrieve the data contents in accordance with the read request. Illustratively, the RAID layer 360 may read the extent in accordance with an extent read operation 468 and pass the extent 610 to the extent store instance. The extent store instance may then decompress the extent 610 in accordance with a decompression technique 456, although it will be understood to those skilled in the art that decompression can be performed at any layer of the storage I/O stack 300. The extent 610 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Layered File System

The embodiments described herein illustratively employ a layered file system of the storage I/O stack. The layered file system includes a flash-optimized, log-structured layer (i.e., extent store layer) of the file system configured to provide sequential storage of data and metadata (i.e., log-structured layout) on the SSDs 260 of the cluster. The data may be organized as an arbitrary number of variable-length extents of one or more host-visible LUNs served by the nodes. The metadata may include mappings from host-visible logical block address ranges (i.e., offset ranges) of a LUN to extent keys, as well as mappings of the extent keys to SSD storage locations of the extents. Illustratively, the volume layer of the layered file system cooperates with the extent store layer to provide a level of indirection that facilitates efficient log-structured layout of extents on the SSDs by the extent store layer.

In an embodiment, functions of the log-structured layer of the file system, such as write allocation and flash device (i.e., SSD) management, are performed and maintained by the extent store layer 350. Write allocation may include gathering of the variable-length extents to form full stripes that may be written to free segments across SSDs of one or more RAID groups, whereas flash device management may include segment cleaning to create such free segments that indirectly map to the SSDs. Instead of relying on garbage collection in the SSDs, the storage I/O stack may implement segment cleaning (i.e., garbage collection) in the extent store layer to bypass performance impacts of flash translation layer (FTL) functionality (including garbage collection) in the SSD. In other words, the storage I/O stack allows the log-structured layer of the file system to operate as a data layout engine using segment cleaning to effectively replace the FTL functionality of the SSD. The extent store layer may, thus, process random write requests in accordance with segment cleaning (i.e., garbage collection) to predict flash behavior within its FTL functionality. As a result, a log-structured equivalent source of write amplification for the storage I/O stack may be consolidated and managed at the extent store layer. In addition, the log-structured layer of the file system may be employed, in part, to improve write performance from the flash devices of the storage array.

Segment Cleaning

Figure 6:
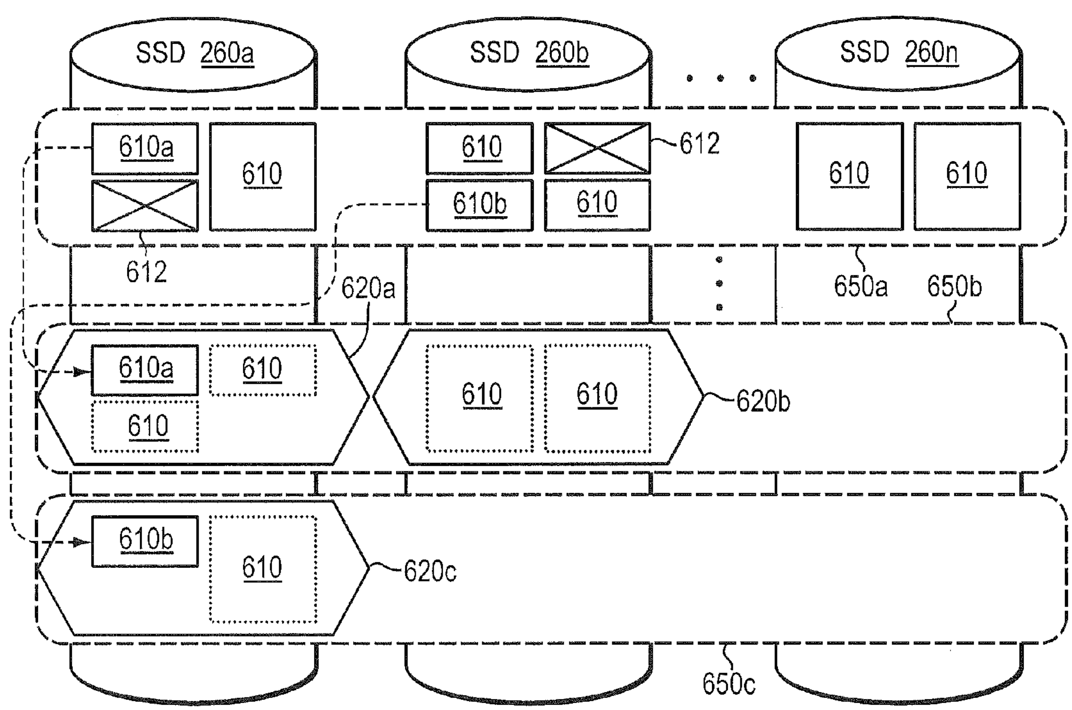
FIG. 6 illustrates segment cleaning by a layered file system of the storage I/O stack.

FIG. 6 illustrates segment cleaning by the layered file system. In an embodiment, the extent store layer 350 of the layered file system may write extents to an empty or free region or "segment." Before rewriting that segment again, the extent store layer 350 may clean the segment in accordance with segment cleaning which, illustratively, may be embodied as a segment cleaning process. The segment cleaning process may read all valid extents 610 from an old segment 650*a* and write those valid extents (i.e., extents not deleted or overwritten 612) to one or more new segments 650*b-c*, to thereby free-up (i.e., "clean") the old segment 650*a*. New extents may then be written sequentially to the old (now clean) segment. The layered file system may maintain a certain amount of reserve space (i.e., free segments) to enable efficient performance of segment cleaning. For example, the layered file system may illustratively maintain a reserve space of free segments equivalent to approximately 7% of storage capacity. The sequential writing of new extents may manifest as full stripe writes 458, such that a single write operation to storage spans all SSDs in a RAID group 820. Write data may be accumulated until a stripe write operation of a minimum depth can be made.

Illustratively, segment cleaning may be performed to free one or more selected segments that indirectly map to SSDs. As used herein, a SSD may be composed of a plurality of segment chunks 620, wherein each chunk is illustratively approximately 1 GB in size. A segment may include a segment chunk 620*a-c* from each of a plurality of SSDs in a RAID group 820. Thus, for a RAID group having 24 SSDs, wherein 22 SSDs store data (data SSDs) and 2 SSDs store parity (parity SSDs), each segment may include 22 GB of data and 2 GB of parity. The RAID layer may further configure the RAID groups according to one or more RAID implementations, e.g., RAID 1, 4, 5 and/or 6, to thereby provide protection over the SSDs in the event of, e.g., failure to one or more SSDs. Notably, each segment may be associated with a different RAID group and, thus, may have a different RAID configuration, i.e., each RAID group may be configured according to a different RAID implementation. To free-up or clean selected segments, extents of the segments that contain valid data are moved to different clean segments and the selected segments (now clean) are freed for subsequent reuse. Segment cleaning consolidates fragmented free space to improve write efficiency, e.g., to underlying flash blocks by reducing performance impacts of the FTL. Once a segment is cleaned and designated freed, data may be written sequentially to that segment. Accounting structures, e.g., free segment maps or an amount of segment free space, maintained by the extent store layer for write allocation, may be employed by the segment cleaning process. Notably, selection of a clean segment to receive data (i.e., writes) from a segment being cleaned may be based upon the amount of free space remaining in the clean segment and/or the last time the clean segment was used. Note further that different portions of data from the segment being cleaned may be moved to different "target" segments. That is, a plurality of relatively clean segments 650*b,c* may receive differing portions of data from the segment 650*a* being cleaned, i.e., illustratively extent 610*a* is moved to segment 650*b* and extent 610*b* is moved to segment 650*c*.

Write Allocation

In an embodiment, there may be multiple RAID stripes per segment. Each time a segment is allocated, i.e., after cleaning the segment, the chunks of various SSDs within the segment may include a series of RAID stripes, each aligned by extent. The chunks may be at the same or different offsets within the SSDs. The extent store layer may read the chunks sequentially for cleaning purposes and relocate all the valid data to another segment. Thereafter, the chunks 620 of the cleaned segment may be freed and a decision may be rendered as to how to constitute the next segment that uses the chunks. For example, if a SSD is removed from a RAID group, a portion (i.e., a set of chunks 620) of capacity may be omitted from the next segment (i.e., change in RAID stripe configuration) so as to constitute the RAID group from a plurality of chunks 620 that is one chunk narrower, i.e., making the RAID width one less. Thus, by using segment cleaning, a RAID group of the chunks 620 constituting the segments may be effectively created each time a new segment is allocated, i.e., a RAID group is created dynamically from available SSDs when a new segment is allocated. There is generally no requirement to include all of the SSDs 260 in the storage array 150 in the new segment. Alternatively, a chunk 620 from a newly introduced SSD can be added into a RAID group created when a new segment 650 is allocated.

Figure 7A:
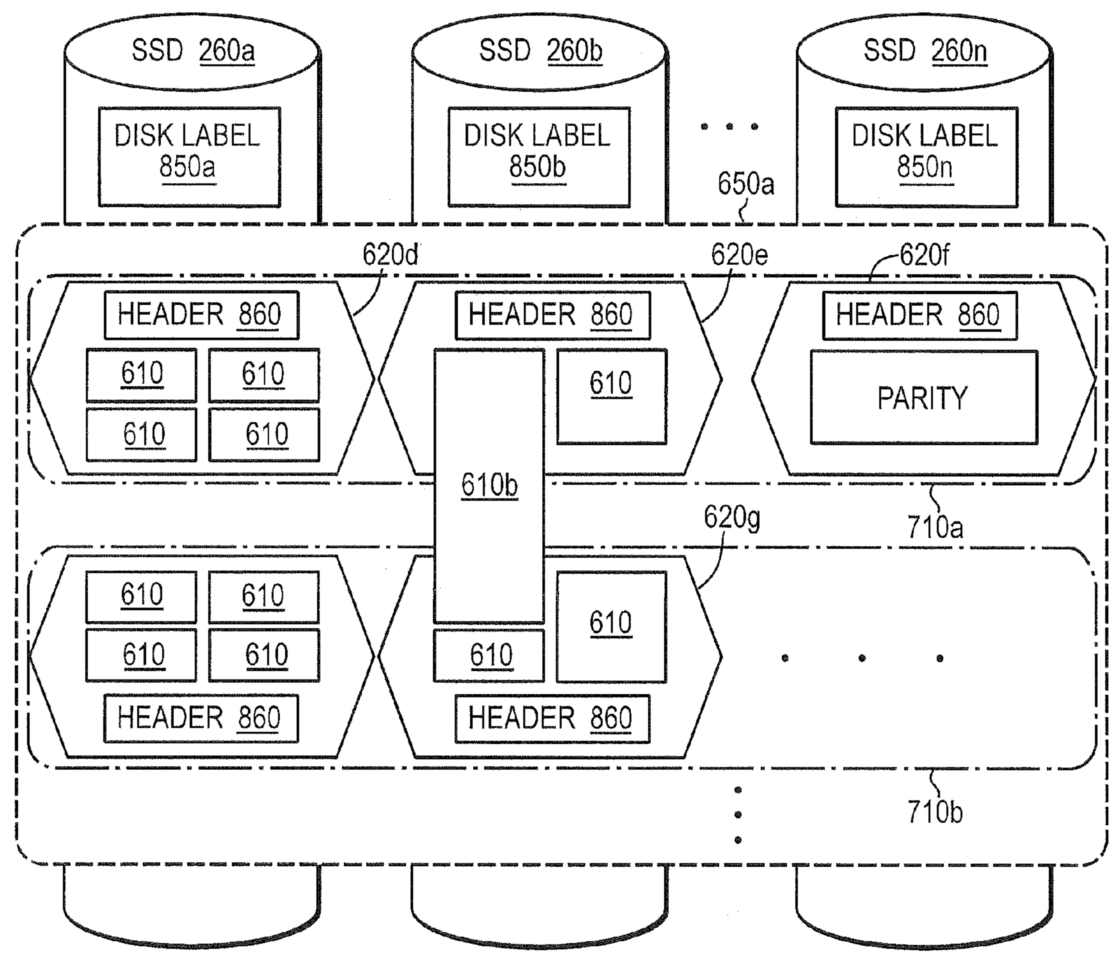

FIG. 7*a* illustrates a RAID stripe formed by the layered file system. As noted, write allocation may include gathering of the variable-length extents to form one or more stripes across SSDs of one or more RAID groups. In an embodiment, the RAID layer 360 may manage parity computations and topology information used for placement of the extents 610 on the SSDs 260*a-n* of the RAID group 820. To that end, the RAID layer may cooperate with the extent store layer to organize the extents as stripes 710 within the RAID group. Illustratively, the extent store layer may gather the extents 610 to form one or more full stripes 710 that may be written to a free segment 650*a* such that a single stripe write operation 458 may span all SSDs in that RAID group. The extent store layer may also cooperate with the RAID layer to pack each stripe 710 as a full stripe of variable-length extents 610. Once the stripe is complete, the RAID layer may pass the full stripe 710 of extents as a set of chunks 620*d-f* to the storage layer 365 of the storage I/O stack for storage on the SSDs 260. Each chunk may include a RAID header 860 and each SSD may include one or more disk labels 850*a-n*, which together facilitate lost write detection as described herein. By writing a full stripe (i.e., data and parity) to the free segment, the layered file system avoids the cost of parity updates and spreads any required read operation load across the SSDs.

In an embodiment, an extent store may be viewed as a global pool of extents stored on the storage arrays 150 of the cluster, where each extent may be maintained within a RAID group 820 of the extent store. Assume one or more variable-length (i.e., small and/or large) extents are written to a segment. The extent store layer may gather the variable-length extents to form one or more stripes across the SSDs of the RAID group. Although each stripe may include multiple extents 610 and an extent 610*b* could span more than one stripe 710*a,b*, each extent is entirely stored on one SSD. In an embodiment, a stripe may have a depth of 16 KB and an extent may have a size of 4 KB, but the extent may thereafter be compressed down to 1 or 2 KB or smaller permitting a larger extent to be packed which may exceed the stripe depth (i.e., the chunk 620*g* depth). Thus, a stripe may constitute only part of the extent, so the depth of the stripe 710 (i.e., the set of chunks 620*d-f* constituting the stripe) may be independent of the extent(s) written to any one SSD. Since the extent store layer may write the extents as full stripes across one or more free segments of the SSDs, write amplification associated with processing information of the stripes may be reduced.

Figure 7B:
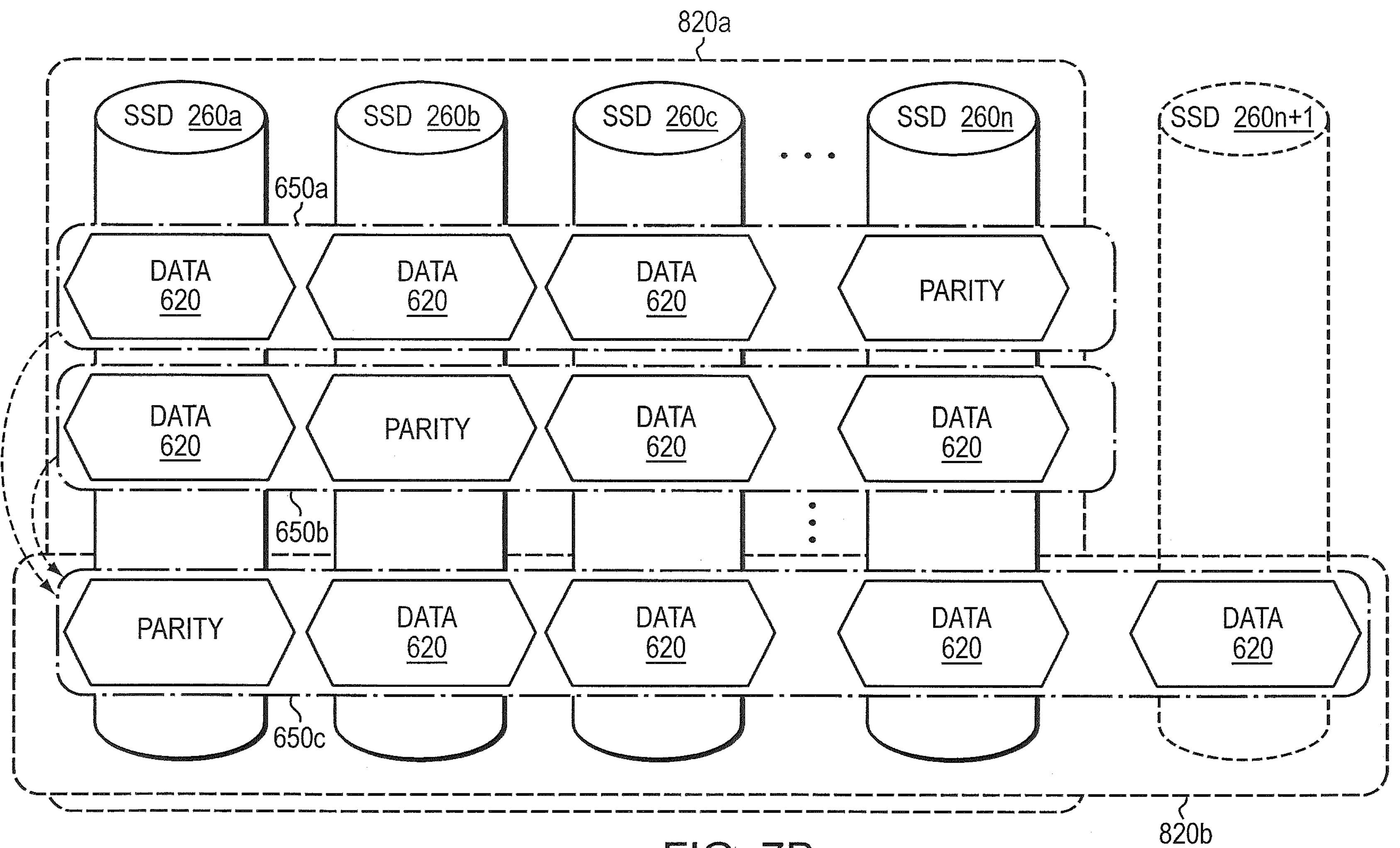

FIG. 7*b* illustrates changes to a segment-based RAID configuration in accordance with changes to the storage pool of the cluster. Illustratively, a plurality of segments 650*a,b* is associated with a RAID group 820*a* having a set of SSDs 260*a-n*. A new (i.e., additional or replacement) SSD 260*n*+1 may be added to the storage array such that existing segments 650*a,b* include SSDs 260*a-n*, while a new segment 650*c* includes SSDs 260*a-n* in addition to SSD 260*n*+1. As the segments 650*a,b* are cleaned, data is written (i.e., moved) from those segments to the segment 650*c*. A new RAID group 820*b* may be created once new segment 650*c* is allocated. The layered file system may then write extents to the new segment 650*c* with the additional capacity available for immediate use either to recover from a degraded level of redundancy or to store additional data.

RAID Group Slices

The embodiments described herein are directed to a RAID organization of storage containers and RAID groups of a cluster configured to reduce parity overhead of the RAID groups, as well as facilitate distribution and servicing of the storage containers among nodes of the cluster. The RAID organization may be configured to identify the SSDs, which may be organized as one or more RAID groups (i.e., aggregates) associated with an extent store. As used herein, an extent store is illustratively a storage container stored on one or more SSDs of the storage arrays. Notably, the RAID groups may be formed from slices (i.e., portions) of storage spaces of the SSDs instead of the entire storage spaces of the SSDs. That is, each RAID group may be formed "horizontally" across a set of SSDs as slices (i.e., one slice of storage space from each SSD in the set). Accordingly, a plurality of RAID groups may co-exist (i.e., be stacked) on the same set of SSDs, such that each RAID group allotted from the set of SSDs may have a similar parity ratio. Because the same set of SSDs houses each RAID group allotted as slices across the set of SSDs, there is no increase in the parity ratio. Each RAID group may still employ a different level of redundancy (e.g., RAID 6 or RAID 5), so that one RAID group may have a different parity ratio from another. That is, each segment within the RAID group may have a different parity distribution and/or an amount of parity overhead. In this manner, differing parity ratios as well as parity distributions may occur segment-by-segment.

In an embodiment, each extent store includes segments horizontally spanning a RAID group, wherein each segment represents a unit of redundancy within the RAID group. That is, parity and data may be arranged on a segment-by-segment basis according to the RAID configuration of the segment supported by the underlying RAID group. Each segment within the same RAID group may thus have different parity distribution and/or amount of parity overhead. For example, one segment may use a slice on a first SSD for parity, whereas another segment may use a slice on a second SSD for parity. In addition, one segment may use single parity protection (e.g., RAID 5) and another segment may use double parity protection (e.g., RAID 6). It should be noted that each segment may be associated with a separate (or the same) RAID group, and that each extent store may be associated with a plurality of RAID groups.

Figure 7C:
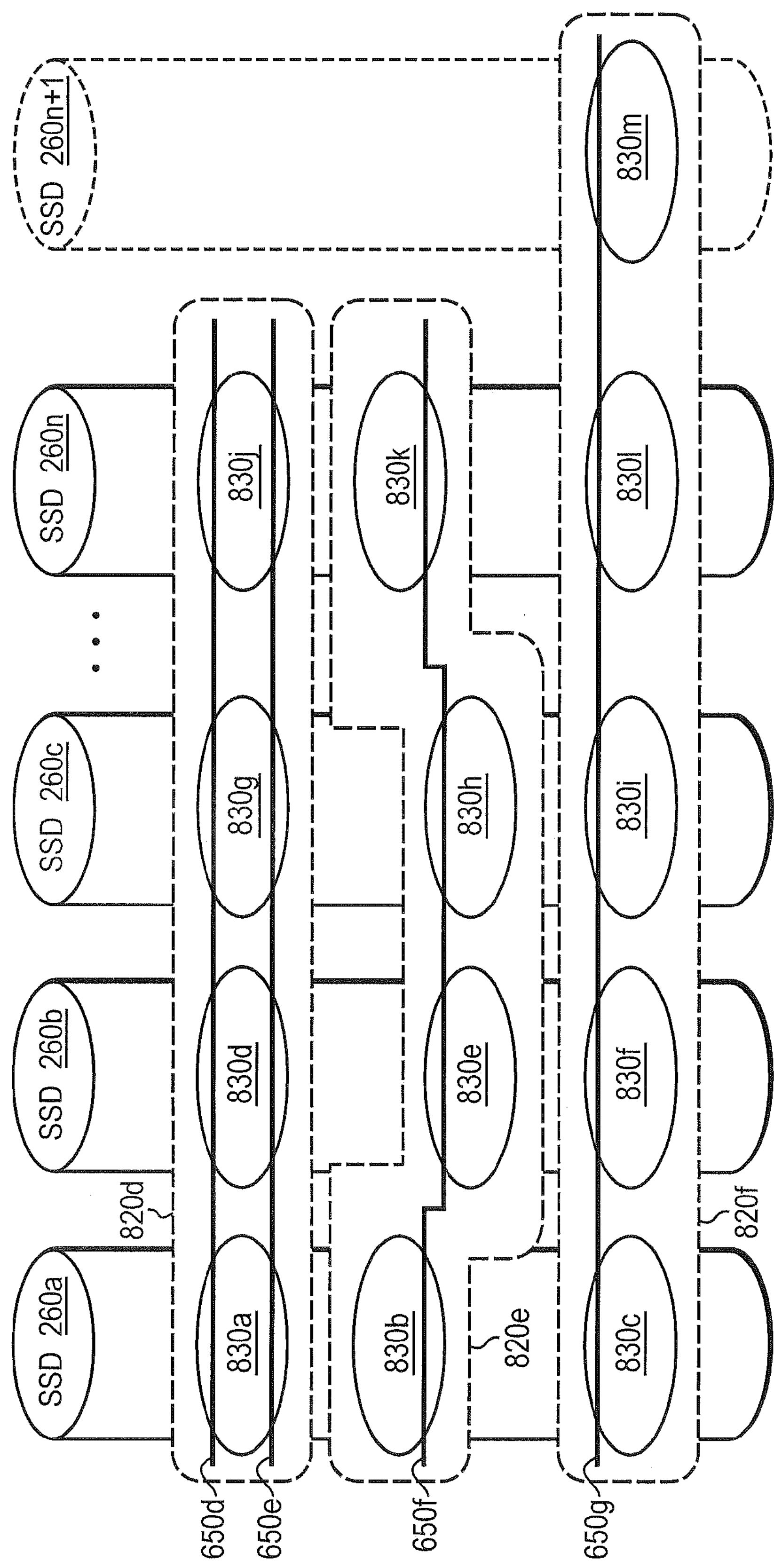

FIG. 7*c* illustrates RAID group slices. In an embodiment, a RAID group 820 may be formed from slices 830 allotted across SSDs 260. For example, SSD 260*a* may be divided into a plurality of slices 830*a-c*, each of which may be respectively allotted to a RAID group 820*d-f*. The slices 830 allotted to a RAID group may illustratively be at the same location on each SSD (i.e., "horizontal"). Alternatively, a RAID group (e.g., RAID group 820*e*) may be formed from slices (e.g., slices 830*b,e,h,k*) at different locations on the respective SSDs (e.g., SSDs 260*a-n*). Each slice 830 may include an equal amount of storage space from each SSD 260 of a set of SSDs allocated to a RAID group. For instance, 100 gigabyte slices may be allotted from each of twenty-two 500 GB SSDs to form a 2.2 terabyte RAID group having a 22+2 RAID configuration. In an embodiment, each slice 830 may also include a disk label 850 so that each slice may be separately managed (i.e., associated with a different extent store). Notably, each RAID group allocated from the set of SSDs may have the same parity ratio, e.g., 2/24=8.3% for the 22+2 RAID configuration. Segments 650 may remain as the unit of redundancy within each respective RAID group, as illustrated for segments 650*d-e* within RAID group 820*d*. That is, the extent stores may be each composed of segments spanning the RAID group, wherein the segments represent the unit of redundancy within the RAID group.

In an embodiment, the SSDs may be configured with multi-host access (i.e., multi-stream) capability to thereby enable more than one extent store to coexist on the same set of SSDs. That is, the multi-stream capability of the SSDs 260 may allow an extent store on a first RAID group 820*d* to be efficiently serviced by one node, while another extent store on a second RAID group 820*e* may be serviced by another node. Thus, different nodes may access different RAID groups on the same SSD as if they were independent. In this manner, extent stores may share SSDs, but those extent stores may be serviced by different nodes of the cluster.

Figure 8A:
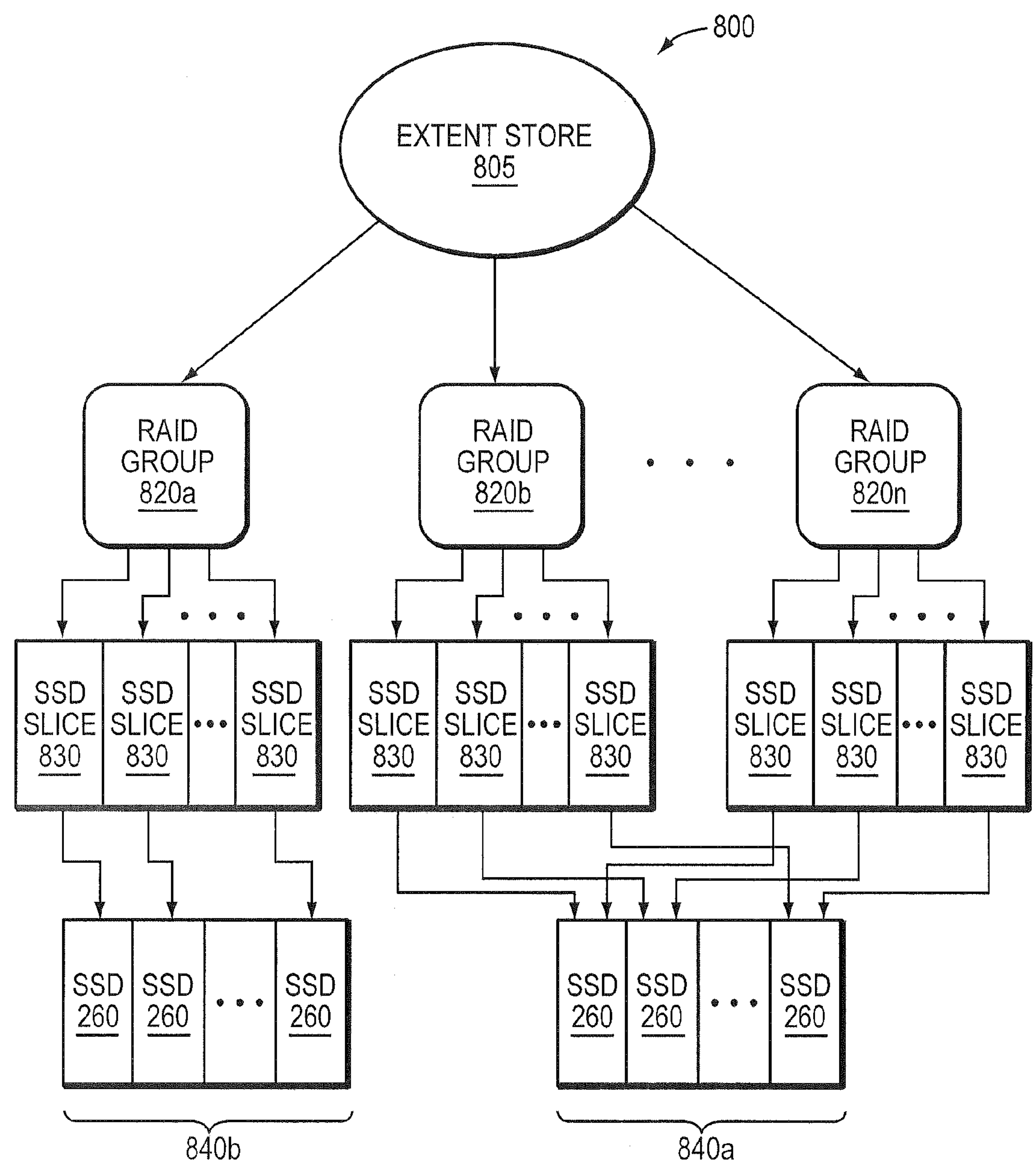

In an embodiment, each SSD may be part of a RAID configuration topology tree structure that defines an extent store using a multi-level hierarchy (e.g., four levels), wherein a first level of the tree identifies SSDs of a set of SSDs, a second level of the tree identifies a slice of the SSD allotted to a RAID group (one from each SSD in the set), a third level identifies the RAID group to which the SSD belongs, and a fourth level identifies an extent store to which the RAID group belongs. FIG. 8A illustrates a RAID configuration topology tree structure 800. An extent store 805 may include one or more RAID groups 820*a-n*, each of which may include a plurality of slices 830 allotted from one or more SSDs 260, which may be grouped into sets 840. Note that the contents of the disk label 850 may be used to construct the RAID configuration topology tree structure. Illustratively, two or more RAID groups 820*b,n* may share the same set 840*a* of SSDs. Also, each RAID group may be associated with at least one segment of the extent store. That is, a plurality of segments 650 may be associated with the same RAID group 820, so that RAID groups may vary by segment (or remain the same), i.e., segment-based RAID configuration. Accordingly, SSDs of the storage array are assimilated into RAID groups by segment.

As noted, RAID groups may illustratively be created when segments are allocated. Further, each segment may be associated with a separate RAID group, so that an extent store may be associated with a plurality of RAID groups, and more than one extent store may coexist on the same set of SSDs. Accordingly, a set of SSDs of the storage array may include a plurality of extent stores, each having a plurality of segments and wherein each segment may be stored on a different RAID group formed from slices across the set of the SSDs.

Lost Write Detection

In an embodiment, write operations resulting in incomplete or corrupt data stored to media of an SSD (i.e., lost write) may be detected by comparing a generation identifier of a segment 650 having the lost write data with an identifier in a RAID header 860 associated with the lost write data. A lost write may be detected when the comparison of the identifiers results in a mismatch. Illustratively, the disk label 850 is used to store the segment generation identifier and the RAID header 860 is used to store the identifier associated with the lost write data.

Figure 8B:
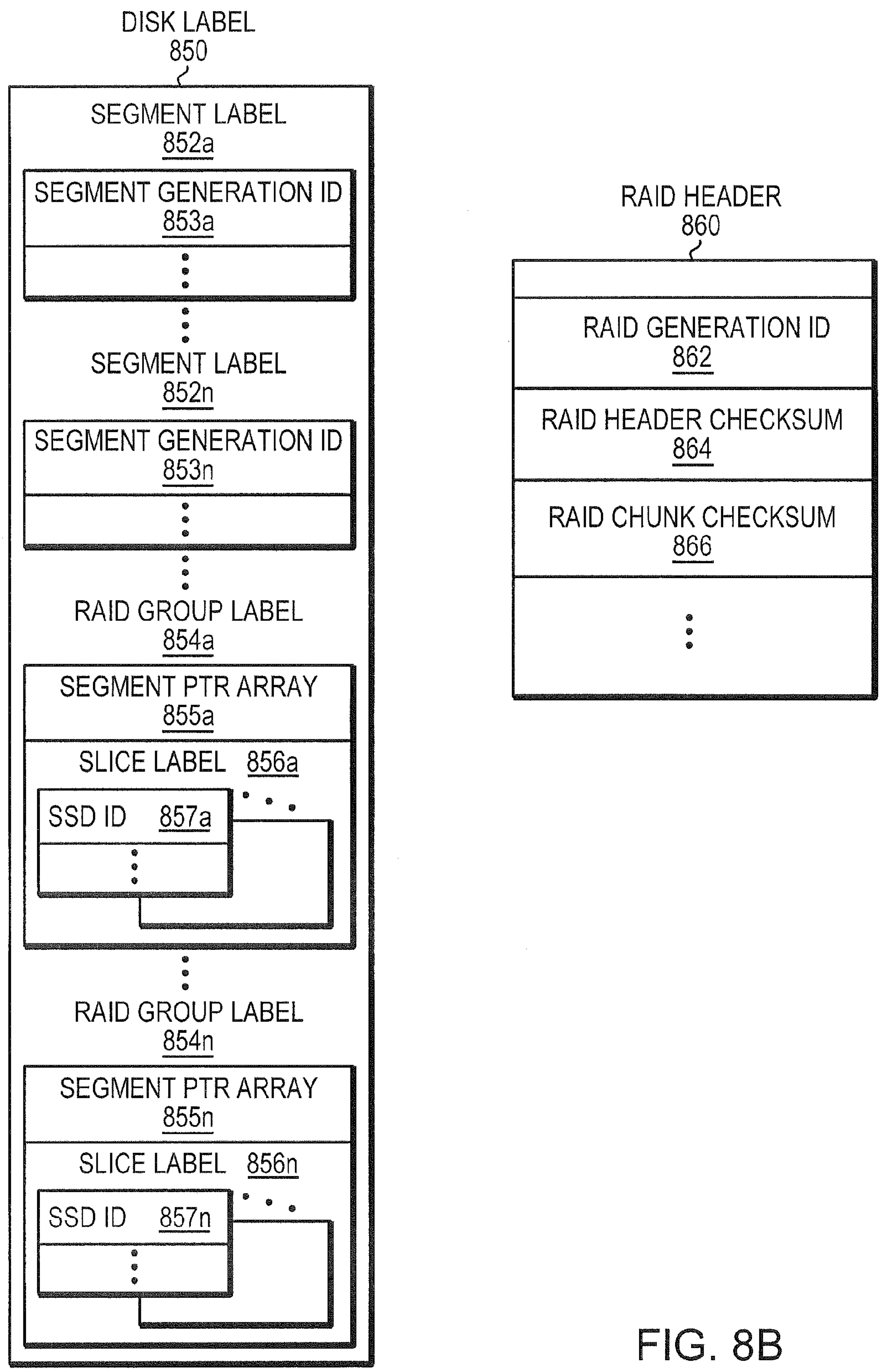

FIG. 8*b* illustrates data structures for a disk label 850 and a RAID block header 860. The disk label 850 may include a set of segment labels 852*a-n* each associated with a segment of the extent store. In turn, each segment label may include a segment generation identifier (ID) 853. The segment generation IDs 853*a-n* may be monotonically increasing numbers (e.g., 32-bit, 64-bit and 128-bit integers) assigned when a segment is created. Alternatively, each segment generation ID may be a unique identifier. In an embodiment, the disk label 850 also includes a set of RAID group labels 854*a-n*, each associated with a RAID group. Illustratively, the RAID group labels may be used to construct the RAID configuration topology tree structure 800 in-core (i.e., in memory 220). To that end, each RAID group label 854 may include an array of segment pointers 855, which reference a set of segment labels 852 such that a RAID group 820*a* represented by the RAID group label 854*a* may be associated with the set of segments 650 represented by the set of segment labels 852 (as referenced by the segment pointer array 855*a*). In addition, each RAID group label 854 may include a set of slice labels 856, each of which has an SSD identifier 857 indicating the SSD 260 storing a slice 830 represented by the slice label 856.

As previously mentioned, each chunk 620 may include a RAID header 860. Illustratively the RAID header 860 includes a RAID generation identifier (ID) 862 provided to identify the segment (i.e., segment generation ID) having the chunk 620; a RAID header checksum 864 provided to ensure that the RAID header metadata information (e.g., RAID generation ID) is stored without error; and a RAID chunk checksum 866 provided to ensure the integrity of the entire chunk 620.

Figure 8C:
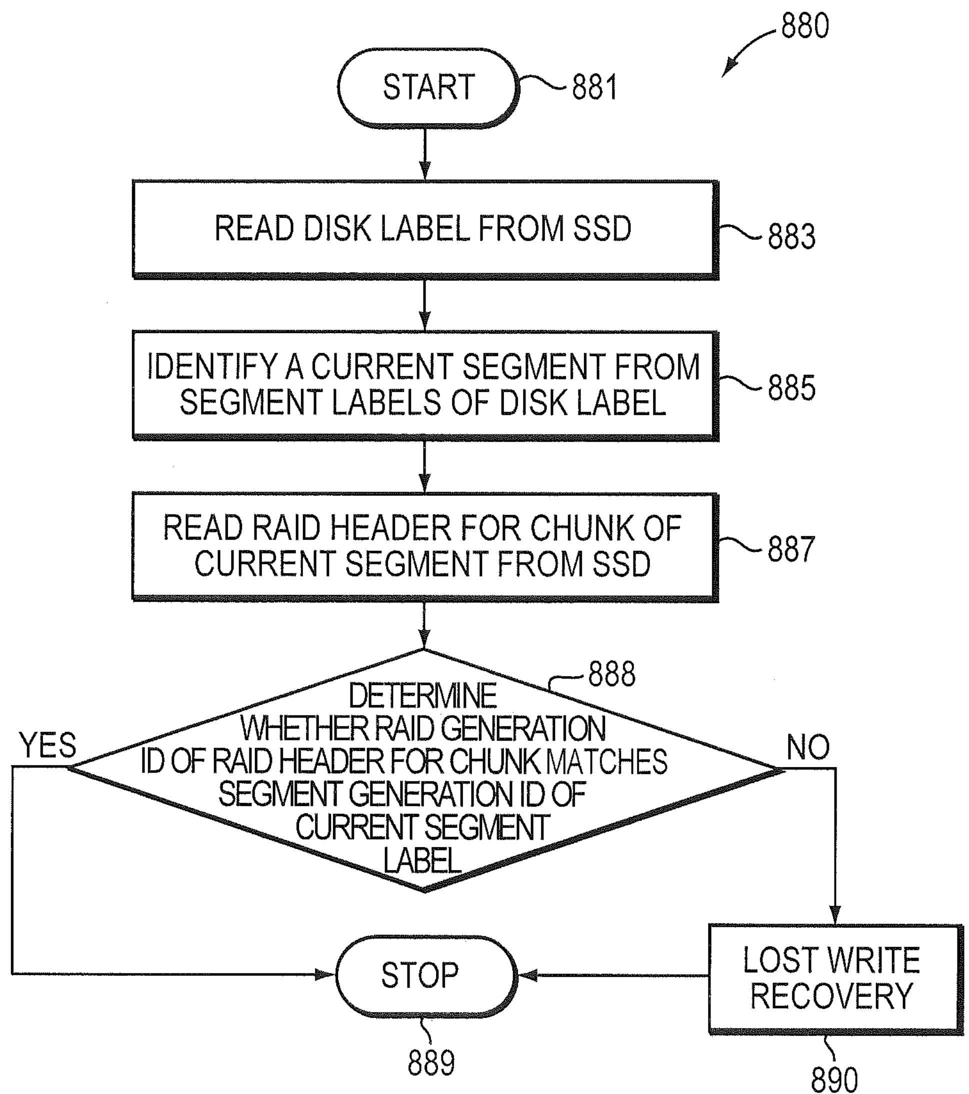

FIG. 8*c* is an example simplified procedure for lost write detection in accordance with one or more embodiments described herein. The procedure 880 starts at step 881 and continues to step 883 where the disk label may be read from SSD. At step 885, a current segment may be identified from the segment labels of the disk label using the segment generation ID. At step 887, a RAID header may be read for a chunk on SSD from the current segment. At step 888, a determination may be made whether the RAID generation ID of the RAID header matches (e.g., is identical to) the segment generation ID. If the identifiers are not identical, then a lost write recovery procedure 890 may be executed, otherwise the lost write detection procedure 880 ends (stops) at step 889. In an embodiment, the lost recovery procedure 890 may include recovery of one or more extents included in the chunk found to have a lost write operation. In other embodiments, one or more extents included in the chunk having lost write data may be deleted with notification to an administrator of the storage cluster. In yet another embodiment, the administrator may be notified with no change to the chunk.

Failover Distribution of Extent Stores

In response to failure of a node, servicing (i.e., ownership) of the failed node's extent stores may be distributed to remaining (i.e., surviving) nodes of the cluster, wherein an extent store instance is the unit of failover. FIG. 9 illustrates a failover of extent store instances. Illustratively, a four-node cluster includes extent stores (as manifested by extent store instances 810*a-f*) that are distributed among the nodes of the cluster. In response to a failure of node 200*b*, all surviving nodes 200*a,c,d* (of a quorum) may attempt to read RAID configuration information stored on the SSDs of the failed node (i.e., SSDs associated with the extent stores served by the failed node 200*b* via extent store instances 810*e,f*), so as to assimilate (i.e., organize) those SSDs into, e.g., one or more RAID groups to thereby enable continuous servicing of the extent stores. After assimilation, a determination may be rendered, e.g., in accordance with an ownership transfer technique, as to the owner of each extent store (i.e., the node determined to service the extent store using an extent store instance). As a result of the technique, the determination may specify that ownership of extent stores of the failed node 200*b* is assumed by nodes 200*c,d*. To that end, extent store instances 810*e,f* are "transferred" to nodes 200*c,d* of the cluster. For example, extent store instance 810*f* may be transferred to node 200*c* and extent store instance 810*e* may be transferred to node 200*d*, such that the nodes 200*c,d* may service the extent stores via instances 810*e,f*, respectively. Note that the contents of extent store(s) remain unaffected; it is the servicing of the extent store(s) via the extent store instances that are failed-over. Accordingly, extent stores may not share RAID groups to allow their transfer to any node in the cluster. That is, every RAID group associated with an extent store instance fails over alongside the extent store instance, so that the RAID group is transferred to the same node as the extent store instance. In this manner ownership of the extent store includes ownership of the RAID group(s) underlying the extent store.

In an embodiment, servicing of the failed node's extent stores may be distributed evenly (i.e., load balanced) to the surviving nodes. Thus, for a cluster of N nodes, extent stores may be evenly distributed among N−1 surviving nodes, wherein each node may have a multiple of N−1, i.e., $m\cdot(N-1)$, extent stores so that m extent stores may be distributed to each of the N−1 surviving nodes. FIGS. 10*a* and 10*b* illustrate failover distribution of extent store instances in a three- and four-node clusters respectively. Illustratively, in a three-node cluster, each of two extent store instances of a failed node 200 is distributed to each of two surviving nodes. Likewise, illustratively in a four-node cluster, each of three extent store instances of a failed node is distributed to each of three surviving nodes so that the load (i.e., servicing of the extent store instances) on the surviving nodes of the cluster is balanced.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:

a central processing unit (CPU) of a node of a cluster having a plurality of nodes;

one or more storage arrays of solid state drives (SSDs) coupled to the node; and a memory coupled to the CPU and configured to store a storage input/output (I/O) stack having a redundant array of independent disks (RAID) layer executable by the CPU, the RAID layer configured to organize the SSDs within the one or more storage arrays as a plurality of RAID groups associated with one or more extent stores, the RAID groups formed from slices of storage spaces of the SSDs instead of entire storage spaces of the SSDs, such that RAID groups co-exist on a same set of the SSDs, the one or more extent stores including segments spanning a RAID group, and wherein each segment within the RAID group represents a unit of redundancy with at least one of different parity distribution and amount of parity overhead.

2. The system of claim 1 wherein different nodes of the cluster access different RAID groups on the same set of the SSDs.

3. The system of claim 1 wherein the SSDs are configured with multi-stream access capability to enable the one or more extent stores to co-exist on the same set of SSDs.

4. The system of claim 3 wherein the multi-stream access capability allows a first node of the cluster to service a first extent store on a first RAID group and a second node of the cluster to service a second extent store on a second RAID group.

5. The system of claim 1 wherein each segment is associated with a separate RAID group.

6. The system of claim 1 wherein parity and data are arranged on a segment-by-segment basis according to a RAID configuration of the segment supported by the RAID group.

7. The system of claim 1 wherein a first segment uses a first slice on a first SSD for parity and a second segment uses a second slice on a second SSD for the parity.

8. The system of claim 1 wherein a first segment uses single parity protection and a second segment uses double parity protection.

9. A method comprising:

executing, by a node of a cluster having a plurality of nodes, a storage input/output (I/O) stack having a redundant array of independent disks (RAID) layer, organizing, by the RAID layer, solid state drives (SSDs) within one or more storage arrays as a plurality of RAID groups associated with one or more extent stores; and forming the RAID groups from slices of storage spaces of the SSDs instead of entire storage spaces of the SSDs, such that RAID groups co-exist on a same set of the SSDs, the one or more extent stores including segments spanning a RAID group, and wherein each segment within the RAID group represents a unit of redundancy with at least one of different parity distribution and amount of parity overhead.

10. The method of claim 9 further comprising:

accessing, by different nodes of the cluster, different RAID groups on the same set of the SSDs.

11. The method of claim 9 further comprising:

configuring the SSDs with multi-stream access capability to enable the one or more extent stores to co-exist on the same set of SSDs.

12. The method of claim 11 further comprising:

using the multi-stream access capability to have a first node of the cluster service a first extent store on a first RAID group and a second node of the cluster to service a second extent store on a second RAID group.

13. The method of claim 9 further comprising:

associating each segment with a separate RAID group.

14. The method of claim 9 further comprising:

arranging parity and data on a segment-by-segment basis according to a RAID configuration of the segment supported by the RAID group.

15. The method of claim 9 further comprising:

using a first slice on a first SSD for parity for a first segment; and using a second slice on a second SSD for the parity for a second segment.

16. The system of claim 1 wherein the RAID group is formed from a slice of storage spaces having different locations on at least two of the SSDs.

17. The system of claim 1 wherein the RAID group is formed from a slice of storage spaces having a same location on at least two of the SSDs.

18. The method of claim 9 further comprising:

forming the RAID group from a slice of storage spaces having different locations on at least two of the SSDs.

19. The method of claim 9 further comprising:

forming the RAID group from a slice of storage spaces having a same location on at least two of the SSDs.

20. A non-transitory computer readable medium having executable program instructions when executed by a processor operable to:

organize solid state drives (SSDs) within one or more storage arrays coupled to the processor as a plurality of RAID groups associated with one or more extent stores; and form the RAID groups from slices of storage spaces of the SSDs instead of entire storage spaces of the SSDs, such that RAID groups co-exist on a same set of the SSDs, the one or more extent stores including segments spanning a RAID group, and wherein each segment within the RAID group represents a unit of redundancy with at least one of different parity distribution and amount of parity overhead.

* * * * *